March 29, 1949.  C. A. MARIEN  2,465,896
PISTON PACKING RING
Filed June 28, 1946  2 Sheets-Sheet 1
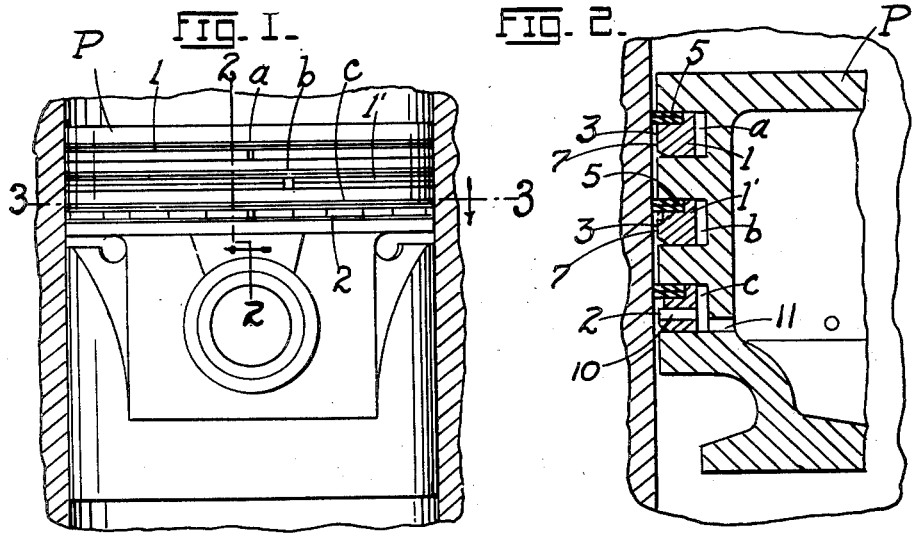
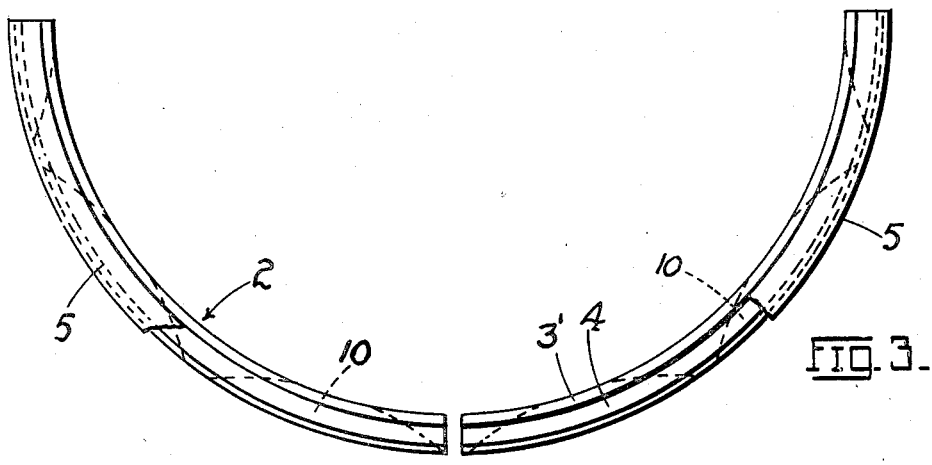
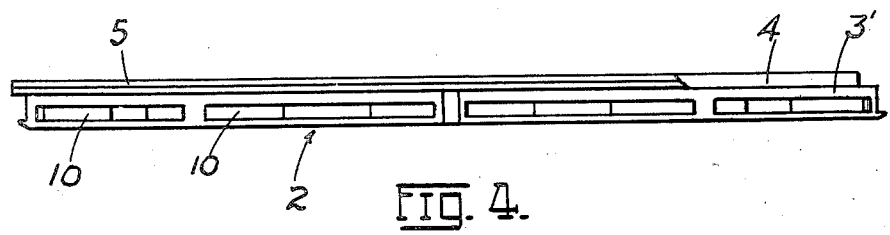
INVENTOR.
Chas. A. Marien.
BY
ATTORNEY.

March 29, 1949.  C. A. MARIEN  2,465,896
PISTON PACKING RING

Filed June 28, 1946  2 Sheets-Sheet 2

INVENTOR.
Chas. A. Marien.
BY
Harry G. Benner
ATTORNEY.

Patented Mar. 29, 1949

2,465,896

UNITED STATES PATENT OFFICE 2,465,896

PISTON PACKING RING

Charles A. Marien, St. Louis, Mo., assignor to Ramsey Corporation, Wilmington, Del., a corporation of Delaware Application June 28, 1946, Serial No. 680,039

5 Claims. (Cl. 309—29)

1

My invention has relation to improvements in piston packing rings and consists in the novel features of construction more fully set forth in the specification and pointed out in the claims.

The invention has for its principal object the provision of a filler for a piston ring groove which will also serve as a carrier for the piston ring proper.

It is a matter of common knowledge in the internal combustion engine art that pistons are provided with grooves of standard widths; and heretofore piston rings have been standardized to fit these grooves. I have discovered that piston rings designed to fit these standard grooves are not as efficient as piston rings having a considerably narrower working face. I have, therefore, evolved what is herein called a "carrier" for a piston ring. The carrier serving to effectively seal the groove against oil leakage and at the same time provide a seat for the piston packing ring which performs its usual functions for sealing against loss of compression and oil pumping.

These advantages will be better apparent from a detailed description of the invention in connection with the accompanying drawings in which—

Figure 6:
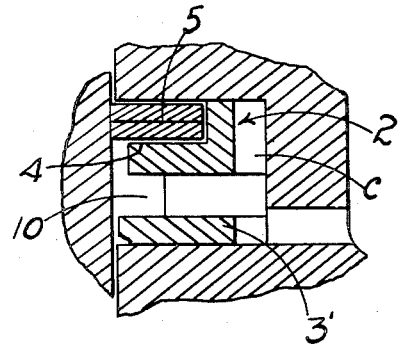
Figure 5:
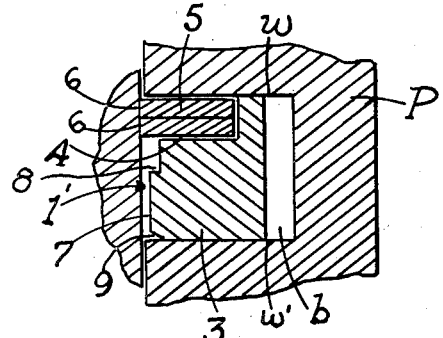
Figure 7:
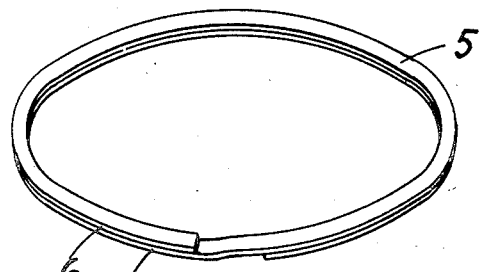
Figure 8:
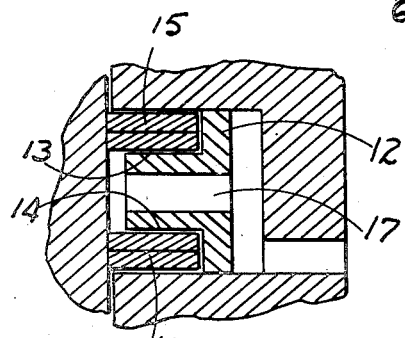
Figure 9:
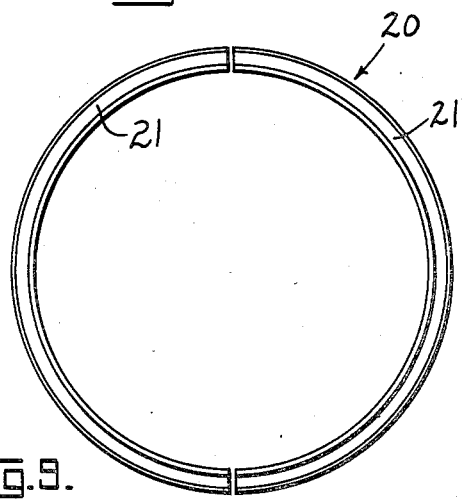

Figure 1 is a side elevation of a conventional piston provided with the usual piston ring grooves wherein my improved rings are mounted; Fig. 2 is a longitudinal section through the piston head, taken on the line 2—2 in Fig. 1 and on an enlarged scale; Fig. 3 is a cross-section taken on the line 3—3 of Fig. 1, also enlarged, but showing only a portion of the piston and ring; Fig. 4 is a side elevation of my improved ring construction; Fig. 5 is an enlarged cross-section through the compression ring shown in the middle groove, considerably enlarged; Fig. 6 is a similar cross-section through the oil ring in the lower groove, similarly enlarged; Fig. 7 is a perspective view of the piston ring proper; Fig. 8 shows a modified form of the invention embodying two sealing rings instead of one as shown in the preceding view; Fig. 9 is a plan of a modified form of carrier ring for the piston ring proper.

Referring to the drawings, P represents a piston of standard construction having ring grooves $a$, $b$, $c$ formed in the piston head, wherein are disposed two compression rings 1, 1', and an oil ring 2, the latter being in the lower-most groove, according to the established practice.

Referring to the two upper rings 1 and 1' the ring assembly comprises a carrier 3 which is designed to substantially fill the ring groove. In other words, the side clearance between the carrier 3 and the upper and lower walls $w$, $w'$ is negligible,

2 approximating .0005 inch. This clearance is sufficient to enable the carrier to be inserted into the groove; but is not sufficient to constitute a working clearance, such working clearance is neither necessary nor desirable, according to the present invention, since the carrier ring 3 is what may be termed a "dead" ring in that it does not have sufficient inherent tension to expand and contract during the operation of the piston. The carrier ring 3 is provided with an annular recess 4, preferably in its upper surface, of a width approximately one-fourth the entire width of the carrier ring 3; and a helical spring segment 5 is disposed within said recess, said segment having substantial inherent tension so as to cause the peripheral surfaces 6, 6 to expand against the wall of the cylinder C when installed therein. Since the carrier ring does not operate in contact with the cylinder wall it may be of any material that will withstand the cylinder temperature and is sufficiently flexible to be inserted into the ring groove. Cast iron, steel and certain plastics are examples of such material.

The outer diameter of the carrier ring 3 is less than the outer diameter of the helical segment 5, so that the peripheral surface 7 of the carrier will, under no conditions, contact the cylinder wall. As stated above, it is not the purpose of the present invention to have the ring 3 serve as a sealing ring; as all of the sealing, both against loss of compression and loss of oil, is accomplished by the helical spring segment 5. The combined widths of the helical segment 5 and that part of the carrier ring 3 lying there below is such that the segment 5 will have a free-working clearance within the groove $a$. This clearance, according to present practice, amounts to approximately .002 inch on both sides. Such working clearance is necessary in view of the fact that the helical segment 5 expands and contracts during the operation of the piston according to the irregularities of the cylinder wall. However, the carrier ring 3 remains stationary in the groove and will ultimately freeze therein due to carbon accumulations. The carrier ring thus in effect ultimately becomes a part of the piston, and the recess 4 in said ring, together with the top land of the groove $a$, in effect becomes the piston ring groove.

If desirable, an oil channel 8 may be provided in the outer face of the carrier ring 3, and the lower edge may be under-cut by the taper 9 as shown.

Referring now to the oil ring 2 in the groove $c$, the construction thereof is similar to that of the compression ring except that drainage passageways 10 are provided entirely around the circumference of the carrier ring 3', to permit the excess accumulations of oil to pass there-through into the groove c from which such accumulations will pass through ports 11 and ultimately reach the crank case of the engine.

In Fig. 8 I show a modified form of the invention wherein carrier ring 12 is provided with recesses 13 and 14 in its upper and lower lateral faces to receive helical spring segments 15 and 16 respectively. The carrier is provided with oil drainage slots 17, although these may be omitted in the case of the compression ring.

In summing up, I desire to point out that the essential feature of the present invention is the adapting of piston ring grooves of standard size to receive a thin helical spring segment by the insertion of a carrier ring for said segment, which serves only as a filler for the groove, and a carrier for the thin segment; and in no way subserves the functions of a piston ring. As stated above, the carrier will ultimately freeze in the groove and in effect become a part of the piston, while the helical spring segment will continue to function as a compression and oil ring, and form an effective packing for the piston.

Many variations of the carrier ring are possible, and I do not wish it understood that I am restricting myself to the specific forms herein shown. Excessive clearance behind the packing ring, which often results due to the variation in groove depths, is eliminated in my improved ring construction. This clearance is designed into the carrier and ring combination and is always uniform.

The helical packing ring contacts the cylinder wall over its entire periphery because of its true circularity and high spring tension, which insures high unit pressure.

In Fig. 9 I show a modified form of construction of carrier ring 20 formed in two equal sections 21, 21 for convenience in placing the carrier ring in the piston ring groove.

Having described my invention, I claim:

1. A piston packing ring comprising two ring components, one of said components consisting of a material having comparatively little spring tension and having a radial gap, said component also having an annular recess in one of its side faces, the other ring component consisting of a flat helical spring member of comparatively high spring tension disposed within said recess, the outer diameter of the first component being less than that of the second component, and the first component exerting no working pressure on the helical spring member.

2. A piston packing ring comprising two ring elements, one of said elements serving as a packing member and having inherent spring tension, the other element serving as a carrier for the spring packing element and having a radial gap and comparatively little spring tension, and exerting no working pressure on the spring packing element.

3. In combination with a piston having a ring groove, a split carrier ring fitted into said groove with less than free working clearance and in non-contacting relation with the cylinder in which the piston operates, said carrier ring having an outwardly presented recess in one of its side faces, and a helical spring segment seated in said recess and having free working clearance with the side of the groove and with said recess.

4. A piston packing ring comprising two ring elements, one of said elements serving as a packing member and having inherent spring tension, the other element being split and serving as a carrier for the spring packing element and having substantially no spring tension and a diameter normally less than that of the cylinder in which the packing ring operates, and the axial width of the inner face of the carrier element being greater than the combined axial width of the outer faces of carrier and packing elements.

5. A piston packing ring comprising two ring elements, one of said elements serving as a packing member and having inherent spring tension, the other element serving as a carrier for the spring packing element and exerting practically no radial pressure on the spring packing element, said carrier being split and having an inwardly presented recess in one of its side faces for receiving the packing element.

CHARLES A. MARIEN.

REFERENCES CITED

The following references are of record in the file of this patent:

UNITED STATES PATENTS

| Number | Name | Date |
| --- | --- | --- |
| 2,240,624 | Marien | May 6, 1941 |
| 2,252,199 | Phillips | Aug. 12, 1941 |
| 2,349,917 | Starr | May 30, 1944 |